United States Patent [19]
Kelley

[11] Patent Number: 5,361,600
[45] Date of Patent: Nov. 8, 1994

[54] EVAPORATIVE COOLER WITH SCRUBBER SYSTEM

[76] Inventor: Franklyn F. Kelley, 7802 N. 36th Dr., Phoenix, Ariz. 85021

[21] Appl. No.: 89,940

[22] Filed: Jul. 12, 1993

Related U.S. Application Data

[63] Continuation of Ser. No. 739,659, Aug. 2, 1991, abandoned.

[51] Int. Cl.⁵ ............................................. F25D 5/00
[52] U.S. Cl. ................... 62/310; 62/259.4; 62/91; 55/228
[58] Field of Search ............... 62/259.4, 78, 91, 310, 62/314; 55/228

[56] References Cited

U.S. PATENT DOCUMENTS

| | | | |
|---|---|---|---|
| 1,078,608 | 11/1913 | Carrier | 62/310 |
| 1,093,869 | 4/1914 | Leinert | 62/310 |
| 1,861,158 | 5/1932 | Hilger | 55/228 X |
| 1,884,534 | 10/1932 | Betz | 62/314 |
| 2,057,579 | 10/1936 | Kurth | 55/228 |
| 2,123,742 | 7/1938 | Offen | 62/91 |
| 3,406,498 | 10/1968 | Wisting | 55/228 X |

*Primary Examiner*—Henry A. Bennett
*Assistant Examiner*—William C. Doerrler
*Attorney, Agent, or Firm*—Gregory J. Nelson

[57] ABSTRACT

A preconditioning scrubber device for treating air prior to introduction into an evaporative cooler having spray nozzles in a duct directing a fine mist or spray into the incoming air flow over substantially the entire cross sectional area of the duct. A filter is positioned adjacent the evaporative media. The spray removes dust, pollutants, particulates, dust and pollen from the air and also wets the surface of the evaporative media.

10 Claims, 2 Drawing Sheets

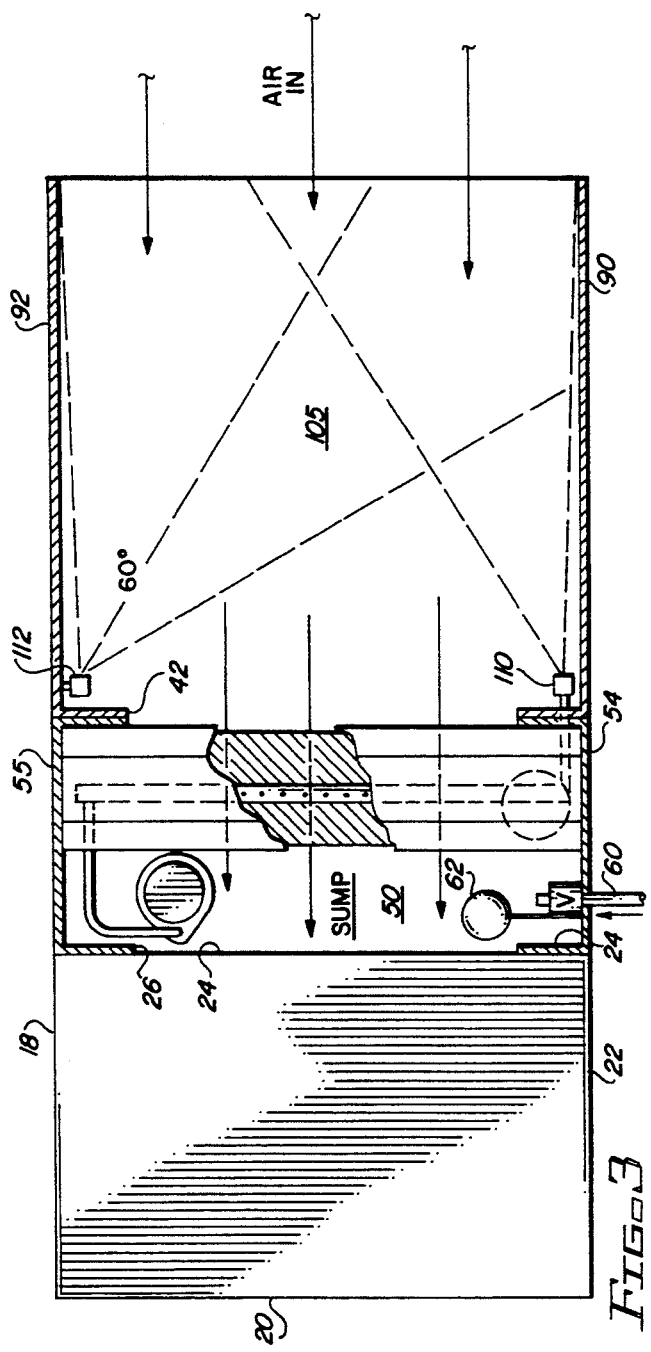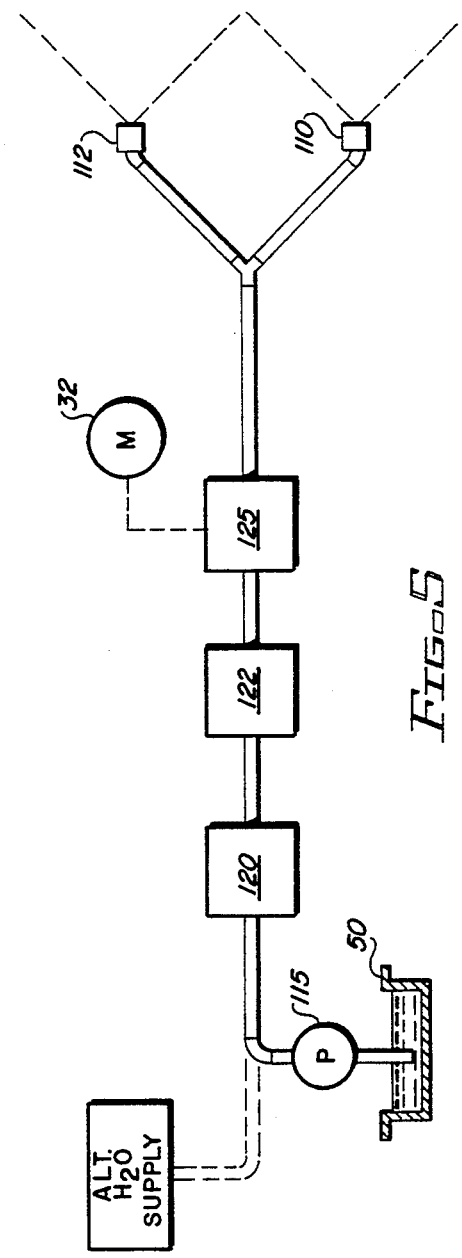

EVAPORATIVE COOLER WITH SCRUBBER SYSTEM

This is a continuation of copending application Ser. No. 07/739,659, filed on Aug. 2, 1991, which has been abandoned.

BACKGROUND OF THE INVENTION

The present invention relates to air conditioning devices and more particularly to an evaporative air conditioning device having a pre-treatment scrubber section for the incoming air.

Field Of the Invention

Cooling air by means of evaporative cooling has been utilized for many years, particularly in relatively dry climates. Conventional evaporative cooling devices generally include a housing which may be square or round in which an air moving device such as a motor driven centrifugal blower is mounted to induce a flow of ambient air into the housing through water-wetted pads. As the relatively dry, ambient air passes through the wetted pads, the air is cooled by the evaporative effect and the air moving device delivers the cooled air to a discharge location which is connected to an appropriate air distribution system communicating with an area in which the temperature is controlled. Water for cooling is supplied from a sump located within the cooler and the water level in the sump is maintained by a float valve. The water is pumped from the sump to the wettable pads by a submersible pump and is distributed across the top of the pads and allowed to flow downwardly through the pads under the influence of gravity. The air passes through the pads and is cooled.

Evaporative coolers of the general type described above have found wide acceptance because of their low initial and operational cost and their effectiveness at least during hot periods of relatively dry or low humidity. However, there are certain disadvantages associated with the use, operation and maintenance of evaporative cooler devices.

During periods of use, substantial quantities of pollutants can be introduced into the temperature-controlled area through an evaporative cooler. For example, noxious gases such as automobile emissions, as well as particulates, dust and pollen are present in the air and while some reduction in these pollutants may occur across the wettable pad, substantial quantities remain and are introduced into the temperature-controlled area. This is particularly true in urban areas where chemical pollutants and automobile emissions may reach high concentrations. In addition, airborne dust, dirt and pollen can reach very high levels, particularly when aggravated by wind or storms which often occur during the hot, dry periods when evaporative coolers are often used.

Accordingly, these pollutants can cause discomfort to occupants and in some cases can create an unhealthy environment for evaporative cooler users.

Accordingly, there exists a need for an improved evaporative cooler which substantially reduces the problem of airborne pollutants and contaminants being carried into the temperature-controlled area.

Briefly, in accordance with the present invention, an improved air conditioning device is disclosed which pre-conditions the air in a scrubber prior to treatment in an evaporative cooler stage to eliminate or substantially reduce noxious fumes and particulate contaminants.

The scrubber section is mounted adjacent the inlet to the evaporative cooler upstream of the evaporative media. The scrubber section has a sloped floor which extends to a sump which may be the sump of the evaporative cooler or may be a separate sump. Two or more airless spray mist nozzles are located within the duct and emit a high velocity spray or fine mist in a direction countercurrent to the incoming air flow. The sprays are oriented to encompass or cover substantially the entire cross-sectional area of the scrubber duct so the incoming air volume is entirely scrubbed. Gases and particulates in solution are removed by the water and flow to the sump. Water mist from the sprays which may be entrained in the air flow will migrate to the evaporative media which serves as a collector for the mist preventing the water mist from being carried into the cooler and the area being cooled. The introduction of water mist ahead of the evaporate media will also serve to prevent build-up of mineral deposits on the face of the pad. The apparatus also includes a filter immediately adjacent the evaporate pad that collects any residual moisture, dirt, mineral dust and other solids and prevents them from entering the cooler and the temperature controlled area.

The water supply to the spray nozzles is subjected to treatment including filtration to remove solids which could plug or damage the spray nozzles. The orientation, pressure and flow rate of the nozzles are carefully regulated to maintain the scrubbing effect without excessive water consumption or at a discharge rate greater than the capacity of the evaporative unit.

Accordingly, it is an object of the present invention to provide a new and improved apparatus for cooling air utilizing the principle of evaporative cooling having a scrubber pre-treatment section.

Another object of the present invention is to provide a new and improved evaporative cooler of the type described above having a moisture collection sump which receives moisture from the scrubber which water is used both for scrubbing and is also employed for wetting the evaporative media.

Another object of the present invention is to provide a new and improved scrubber which is adaptable to conventional evaporative coolers of various designs including down draft and side draft units having either a single or multiple evaporative media pads.

Yet another object of the present invention is to provide a new and improved evaporative cooler having an initial scrubber stage which utilizes a fine water mist sprayed directly countercurrently to the incoming air flow to remove pollutants, particulates, dust and pollen.

It is another object to provide an evaporative cooler which minimizes carry-over of dust, moisture and other particulates into the temperature controlled area.

It is another object of the present invention to provide a new and improved evaporative cooler of the type described above which is highly efficient and which increases the saturation efficiency of the evaporative unit as compared with conventional units.

The foregoing and other objects and advantages of the present invention, as well as the invention itself will be more fully understood from the following description when read in conjunction with the accompanying drawings:

FIG. 3 is a sectional view taken along lines 3—3 of FIG. 1;

FIG. 5 is a schematic representation of the spray nozzle system.

Figure 4:
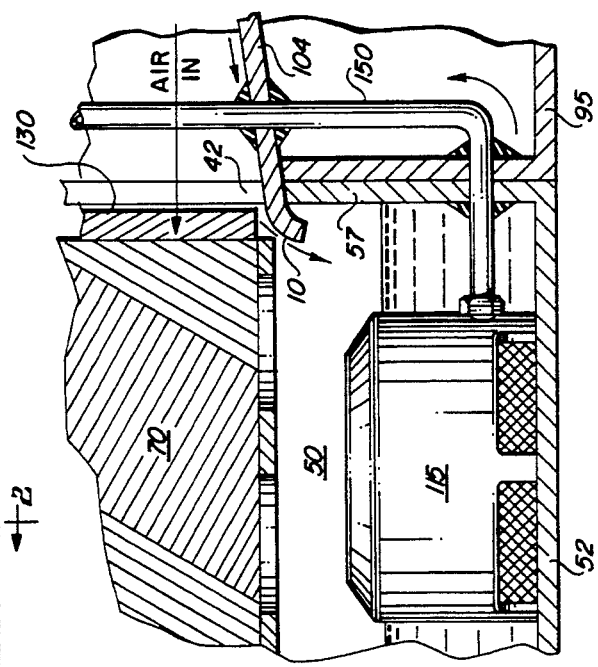
FIG. 4 is an enlarged detail view of a portion of the sump as indicated in FIG. 1.
Figure 1:
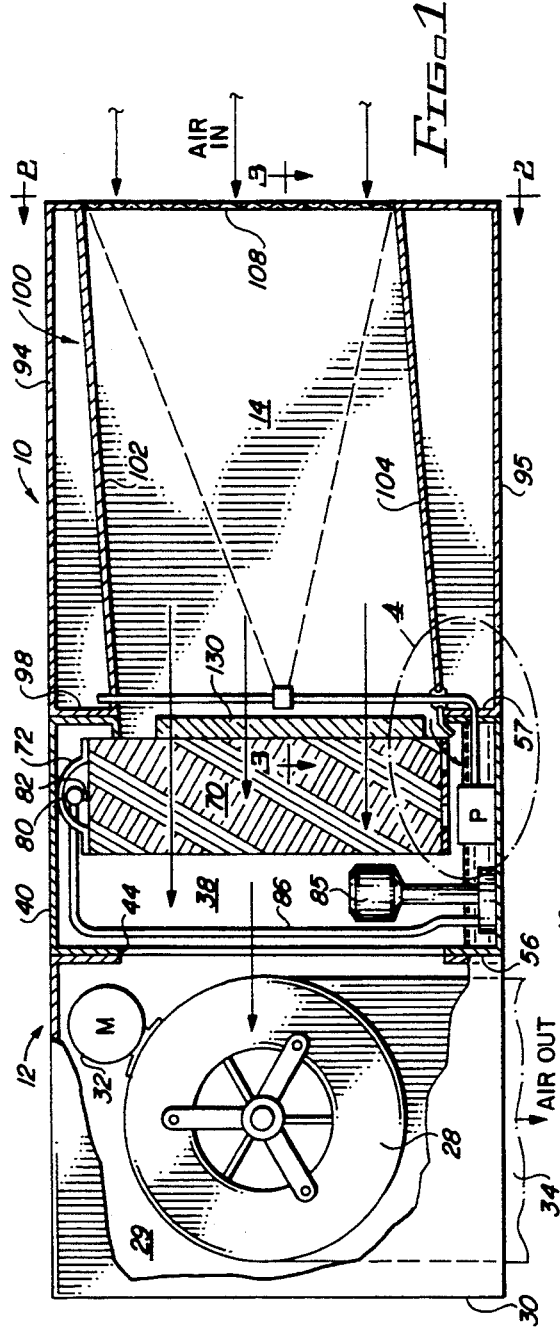
FIG. 1 is a longitudinal sectional view of an evaporative cooler provided with an initial scrubber in accordance with the present invention.

Turning now to the drawings, in which illustrate the improved evaporative cooler system of the present invention is indicated by the numeral 10. The evaporative cooler 10 includes evaporative cooler section 12 and scrubber section 14. Evaporative cooler section 12 may be any conventional type of evaporative cooler such as an Arvin Master Cooler, Aero Cool, or Champion Ultra Cool unit. The evaporative cooler has a cabinet 15 which is shown as being generally rectangular having a top wall 16 and upstanding side walls 18, 20, 22 and 24. A single inlet 26 is provided in side wall 24 to admit air into the air mover chamber 29. The air mover is housed in chamber 29 and has a centrifugal blower 28, journaled for rotation within housing 30 and driven by electric motor 32 through a suitable pulley arrangement. Rotation of the blower wheel creates a negative static pressure within the chamber which induces a flow of ambient air through the unit. For purposes of illustration, the unit is shown as a down-draft unit discharging cooled air at outlet 34 into a duct arrangement which distributes the air to the temperature controlled space or area to be cooled. the blower may be a single or multiple speed unit.

An evaporator section 38 is interposed in the air flow path ahead of the air mover. The evaporator section is contained in a rectangular housing 40 having a exterior configuration generally conforming to that of cabinet 15. Inlet 42 and outlet 44 are provided at opposite sides of the evaporative section. Outlet 44 communicates with and is coincident with inlet 26 to the air mover chamber. A sump 50 is defined in the bottom of the evaporator section 38 by floor 52 and side walls 54, 55, 56 and 57. Water supply line 60 is connected to receive water under pressure from a suitable source such as a domestic supply. The water supply line 60 discharges into the sump at a float controlled valve 62 to maintain the level of the water in the sump at a predetermined level. Cooling of air occurs in the evaporator section 38 as air is drawn through the wetted cooling media.

As shown, the cooling media consists of a wettable pad 70 vertically positioned within the cooling chamber within a frame 72 in the air flow path. The cooling media has an area which at least corresponds to the area of the inlet 42 to the evaporator section. The wettable pad mounted in the evaporator section may be manufactured from a fibrous material such as excelsior or, as shown, may be a pad of treated paper having channels therein and representative of these types of pads are the pads sold under the name Celdek. Water is applied to the upper surface of the wettable pad at a distribution tube 80 having a plurality of nozzles or discharge orifices 82 therein. A circulating pump 85 delivers water from the sump 50 via line 86 to the distribution tube along the top of the pad. The water delivered to the top of the wettable pad by the delivery tube is discharged and under the influence of gravity flows downwardly through the pads 70 and the unevaporated water returns to the sump 50 for recirculation. As the relatively dry, ambient air passes through the wetted pad, the air is cooled by the evaporative effect and the air moving device delivers the cooled air to the discharge 34 which is connected to appropriate duct or air distribution systems.

The foregoing is conventional and representative of a number of cooler designs as indicated. The scrubber section 14 is shown as an initial treatment stage ahead of the cooling stage and may be associated with evaporative coolers of various design, the cooler shown being only representative. The purpose of the scrubber section is to provide a pre-treatment stage in which noxious gases, particulates, dust, pollen, chemical pollutants and the like are at least partially removed or scrubbed from the incoming air. Further, the scrubber section also contributes some evaporative cooling effect by evaporative cooling and sensible heat transfer which, when added to the cooling effect occurring in the evaporator section, improves the overall saturation efficiency of the device. The scrubber section 14 includes a housing having opposite side walls 90 and 92, top wall 94, bottom wall 95 and inlet end wall 96 and outlet end wall 98. A scrubber chamber 105 is defined by a duct 100 within the scrubber housing including a top plate 102 and a bottom plate 104 each extending transversely between the side walls 90 and 92 of the scrubber section. The top and bottom plates are both pitched or inclined downwardly from the inlet end of the duct to the discharge end of the duct with floor 104 terminating at a lip 106 which is located above the sump 50. Preferably the duct material is a suitable rust-resistant material such as stainless steel or a plastic such as polypropylene or fiberglass. Louvers or screening 108 are provided at the inlet to the scrubber chamber to prevent leaves, birds, animals or airborne litter from entering into the unit.

Figure 2:
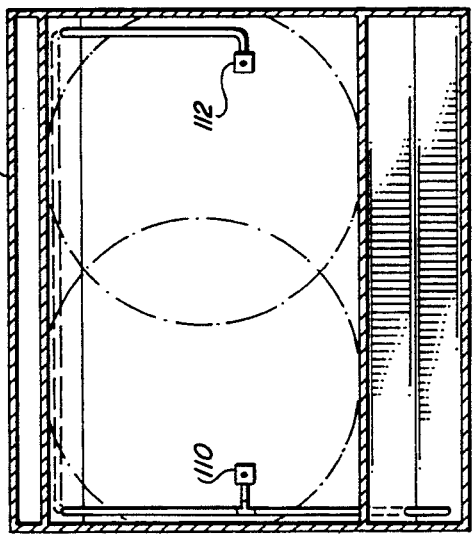
FIG. 2 is a sectional view taken along lines 2—2 of FIG. 1.

The scrubbing of the incoming air is achieved by spray nozzles 110, 112 which are directed to discharge countercurrently to the incoming air flow. As best seen in FIG. 2, spray nozzles are each positioned adjacent the discharge end of the scrubber at an intermediate elevation within the scrubber duct and adjacent the opposite side walls. Nozzle 110 is shown adjacent side wall 90 and nozzle 112 is shown adjacent side wall 92 having a generally conical spray pattern. Each of the nozzles is of the type as manufactured by Spray Company System of Wheaton, Ill., full cone spray TGO.3 at 30 psi, two nozzles delivering 6.24 gph. As best seen in FIGS. 2 and 3, the nozzles are adjustable and are oriented to direct the spray away from the adjacent side wall so that the conical spray patterns overlap to some extent to provide substantially complete coverage of the cross-sectional area of the scrubber duct. A spray angle of approximately 60° has been found to work well. The spray nozzles are adjustable and the spray pattern and pressure are regulated to provide full coverage directing the spray into the oncoming air without loss of spray at the duct entrance even at the lowest blower speed.

The spray nozzles are each connected to a water supply line 150 which receives water under pressure from the sump 50 from a submersible pump 115. Typically the water pressure is in the range of 20# to 100#. As seen in FIG. 5, a suitable filter 120, pressure regulator 122 and electrically operated solenoid valve 125 are interposed between the pump 115 and spray nozzles 110, 112. The filter is provided to remove particulate matter such as sand or rust which could plug the spray nozzles. The pressure regulator 122 maintains a predetermined water pressure to maintain the desired water delivery rate. The solenoid valve 125 is connected to the electrical circuit of the evaporative cooler allowing water to be discharged form the nozzles when the blower is running. In addition, spray nozzles of the type described above also are provided with internal filters as secondary protection against plugging.

Alternatively, the nozzles may be directly connected to any convenient water source such as a domestic supply which has adequate line pressure. The supply will be filtered and regulated as shown in FIG. 5 and controlled by a solenoid valve to operate only when the blower 28 is energized.

The spray nozzles each deliver a fine mist in the direction indicated in the drawings which is in a direction countercurrent to the air movement through the scrubber. In this manner, some evaporation thus cooling of the incoming air will occur within the scrubber section. More importantly, the spray nozzles will emit a fine mist of water droplets which will serve to entrap gases and particulate material. The water spray will impinge on the walls of duct 100 and flow to the bottom plate of the scrubber to be carried under the influence of gravity to the main sump 50. As seen in FIG. 4, plate 104 of the scrubber is provided with a small down-turned lip 106 which will serve to direct the water returning from the scrubber to the sump 50 of the evaporator section. The sump generally is provided with a standpipe or overflow which will bleed-off excess water and will serve to prevent excess mineral concentrations from occurring.

Another important feature is that the spray will wet the surface of the evaporative media pad 70 to prevent build-up of mineral deposits of the face of the pad. This enhances pad performance and increases pad life which is particularly important in the case of the more expensive Celdek type pads.

Also, a filter such as a fiberglass mat 130 is placed at the face of the evaporative media. The mat 130 collects water, mist, dirt and solids. The mat also helps to prevent mineral build-up on the evaporative pad. It is critical in a spray evaporation system to prevent dirt, dust and evaporative residue (which can be harmful to the lungs) from entering into the temperature controlled area.

In order to test the effectiveness of use of the scrubber in removing pollutants and contaminants, a conventional Arvin Master Cool evaporative unit was equipped with a scrubber section as shown in the drawings. The scrubber section included a 34" rectangular duct sloped downwardly at about a 2-12 pitch having a duct approximately 30" high and 40" wide. Spray nozzles were mounted in the duct at an intermediate location adjacent the opposite side walls and were of the following type and model designated above. The evaporative cooler had an air delivery rate of approximately 6,000 cfm which provided about one second exposure to the fine mist of water emanating from the spray nozzles in the scrubber section. The orifice in each of the nozzles was controlled to provide approximately a water delivery rate of 6-8 gallons per hour. The sprayed water served to remove a substantial portion of the gases and particulates. The water containing these contaminants was carried back to the main cooler water sump. Any water entrained in the air was carried directly towards the pad in the evaporative cooling section which was a Celdek pad which served as a collection for the mist preventing carry-over of water into the air mover section.

An evaporative cooler of this size normally uses approximately 10-14 gallons of water per hour in the evaporation and cooling process. The return flow from the scrubber section was approximately 6-8 gallons and therefore was not in excess of the usage rate of the evaporative cooler, so the difference in water requirements was maintained by the float valve 62. Should any excess water occur from the mist system during periods of high humidity where hourly evaporative requirements are low, the excess water would be overboarded by the conventional stand pipe overflow.

The water delivered to the spray nozzles was filtered and regulated to maintain a delivery pressure at the nozzles of approximately 30 psi. The solenoid valve maintained the spray nozzles operative only when the main evaporative cooler motor was operating.

As described above, the scrubber has been shown in connection with a single inlet cooler of the type having a Celdek evaporative pad. However, the scrubber can be adapted to the conventional three and four-sided conventional evaporative coolers. FIG. 6 shows such an arrangement in which an evaporative cooler is shown having a generally rectangular cabinet 150 with air inlets defined in the upstanding side walls 152, 154, 156 and 158. The cabinet houses the air mover and evaporative pads and water delivery system as is conventional and has been explained above. Evaporative cooling media is located in the cabinet adjacent the inlets.

The scrubber 160 includes a shroud 165 which completely encloses the evaporative unit with an extending scrubber duct section 166 having an inclined floor 170. The spray nozzles 172, 174 are positioned in the duct oriented to direct a fine spray under pressure concurrently to the air flow through the scrubber duct section. The spray nozzles are connected to a water delivery line which is connected to a pump located in sump 180 of the evaporative cooler. An appropriate filter, pressure regulator and solenoid valve are interposed in the water supply line. All of the incoming air is introduced to the interior of the shroud through the scrubber duct section where it is scrubbed by the fine mist. The air exiting the scrubber section may then flow circumferentially about the evaporative cooler to be drawn into the multiple inlets at the sides of the cooler. A significant advantage is that the addition of the scrubber to an evaporative cooler requires very little additional energy. The only additional energy requires is the energy to activate the pump and the electrical solenoid. If the scrubber is operated from a pressurized domestic water supply, additional pumping is not required.

It will be obvious to those skilled in the art to make various changes, alterations and modifications to the invention described herein. To the extent that these changes, alterations and modifications do not depart from the spirit and scope of the appended claims, they are intended to be encompassed therein.

I claim:

1. An air pretreatment apparatus to effect cooling and reduce contamination for use with an evaporative cooling device of the type having a cabinet with an intake for air to be cooled and a discharge for cooled air, air delivery means having air moving means for inducing air flow from the intake to the discharge, and evaporative treatment means including evaporative cooling media in said air flow path, a sump and a water supply for delivering water to said evaporative media to effect evaporative cooling of air, said pretreatment apparatus comprising:

(a) a generally imperforate housing positionable at the intake to the evaporative cooling device defining an air flow duct substantially free of obstruction having an inlet end through which an air stream enters the duct at the inlet end and flows to the intake of the evaporative cooling device at the discharge end of the duct;

(b) a water collection sump for receiving the moisture collected from within the air flow duct;

(c) at least one spray nozzle in said air flow duct located adjacent the discharge end of the duct connected to a water supply system oriented to spray finely divided water mist and being directed into the incoming air stream flowing to said evaporative cooler intake substantially countercurrently to the direction of flow to subject the air to the mist for a predetermined residence time to remove particulates and enhance evaporization efficiency;

(d) said duct having return means adapted to direct water collected in the duct to the said sump; and (e) a filter means interposed in the air stream flow between the duct and evaporative cooling media and positioned generally normal to the air stream flow in the duct.

2. The apparatus of claim 1 wherein said evaporative cooling device is a single intake device having a generally vertically mounted honeycomb evaporative media member.

3. The apparatus of claim 1 having multiple spray nozzles oriented to emit a generally conical spray and positioned at opposite sides of said duct at an intermediate elevation to cover substantially the entire cross sectional area of the duct.

4. The apparatus of claim 1 wherein said evaporative cooling device and said pretreatment apparatus utilize a common sump and wherein said duct floor has a lip for directing water into the sump.

5. The apparatus of claim 1 wherein said water supply system includes a water filter, pressure regulator and valve operative to deliver water to the spray nozzles when the evaporative cooling is operative.

6. The apparatus of claim 1 wherein said evaporative cooling device has multiple intakes and wherein said housing communicates with a shroud member enclosing said multiple intakes.

7. The apparatus of claim 1 wherein said evaporative cooling device is generally rectangular in cross section and said housing has opposite side walls and said air flow duct is defined by a portion of said housing side walls and transversely extending panels extending between the housing side walls of one of which is downwardly inclined in the direction of air flow through the duct establishing said return means.

8. The apparatus of claim 1 further including a screen in said duct.

9. The apparatus of claim 7 wherein the overall size of the duct is selected so as to provide a residence time of the air flow therethrough of approximately one second.

10. An evaporative cooling apparatus comprising:
(a) a cabinet having an intake for air to be cooled and a discharge for cooled air;
(b) air delivery means having air moving means inducing an air flow from the said intake to the discharge;
(c) evaporative cooling media located at said intake;
(d) water supply for delivering water to said evaporative cooler means;
(e) a generally imperforate air duct located adjacent said evaporative cooling media having an inlet and a discharge whereby an air stream is induced through said duct by said air moving means, said duct being substantially free of obstructions;
(f) at least one spray nozzle in said air flow duct located adjacent the duct discharge connected to said water supply oriented to direct a spray substantially countercurrently into the incoming air stream over substantially the entire cross sectional area of the duct to cool the air stream and reduce contaminants;
(g) return means associated with said duct to return water collected in the duct to a collection sump; and
(h) filter means interposed in the air stream flow between the duct and media and positioned generally normal to the air stream flow in the duct.

* * * * *